(12) United States Patent
Cuevas Ramirez et al.

(10) Patent No.: US 10,182,004 B2
(45) Date of Patent: *Jan. 15, 2019

(54) MOBILE TELECOMMUNICATIONS ROUTING

(71) Applicant: British Telecommunications Public Limited Company, London (GB)

(72) Inventors: Maria Cuevas Ramirez, London (GB); Scott Bailey, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/560,452

(22) PCT Filed: Mar. 2, 2016

(86) PCT No.: PCT/EP2016/054457
§ 371 (c)(1),
(2) Date: Sep. 21, 2017

(87) PCT Pub. No.: WO2016/150668
PCT Pub. Date: Sep. 29, 2016

(65) Prior Publication Data
US 2018/0077053 A1 Mar. 15, 2018

(30) Foreign Application Priority Data
Mar. 25, 2015 (EP) .................... 15275086

(51) Int. Cl.
*H04W 40/00* (2009.01)
*H04L 12/725* (2013.01)
(Continued)

(52) U.S. Cl.
CPC ............ *H04L 45/306* (2013.01); *H04L 45/42* (2013.01); *H04L 47/2475* (2013.01);
(Continued)

(58) Field of Classification Search
CPC ..................................................... H04W 40/00
See application file for complete search history.

(56) References Cited

U.S. PATENT DOCUMENTS 8,086,238 B1 * 12/2011 Kosar .................. H04W 8/065
455/433
8,489,101 B1 7/2013 Bestermann
(Continued)

FOREIGN PATENT DOCUMENTS

| EP | 2237506 A1 | 10/2010 |
| EP | 2312798 A1 | 4/2011 |
| WO | WO 2016/150669 A1 | 9/2016 |

OTHER PUBLICATIONS

U.S. Appl. No. 15/560,463, filed Sep. 21, 2017, Inventors: Ramirez et al.

(Continued)

*Primary Examiner* — Zhiren Qin
(74) *Attorney, Agent, or Firm* — Amy M. Salmela; Patterson Thuente Pedersen, P.A.

(57) ABSTRACT

A telecommunications mobility management system is arranged to allocate a mobile unit to different switching routes for different classes of service, for example to allow services capable of operation over packet-switched and circuit-switched to be managed separately. Separate location updates are transmitted to a register, and flagged for selective retrieval by a routing function when an incoming connection request is made, the appropriate switch ID being selected according to the class of service to which the connection request relates.

9 Claims, 12 Drawing Sheets

(51) Int. Cl.
    *H04L 12/859*     (2013.01)
    *H04L 12/911*     (2013.01)
    *H04W 36/00*     (2009.01)
    *H04W 36/14*     (2009.01)
    *H04L 12/717*     (2013.01)
    *H04W 8/04*     (2009.01)
    *H04W 40/02*     (2009.01)
    *H04L 12/707*     (2013.01)
    *H04W 40/24*     (2009.01)

(52) U.S. Cl.
    CPC ............... *H04L 47/70* (2013.01); *H04W 8/04* (2013.01); *H04W 36/0022* (2013.01); *H04W 36/14* (2013.01); *H04W 40/02* (2013.01); *H04L 45/22* (2013.01); *H04W 40/24* (2013.01)

(56) References Cited

U.S. PATENT DOCUMENTS

| | | | |
|---|---|---|---|
| 2002/0006797 A1 | 1/2002 | Virtanen et al. | |
| 2004/0090913 A1 | 5/2004 | Scudder et al. | |
| 2004/0185854 A1 | 9/2004 | Artola et al. | |
| 2005/0281205 A1 | 12/2005 | Chandwadkar et al. | |
| 2006/0268835 A1 | 11/2006 | Hyotylamen et al. | |
| 2008/0039104 A1* | 2/2008 | Gu | H04W 8/04 455/445 |
| 2008/0102844 A1* | 5/2008 | Zhu | H04L 45/00 455/445 |
| 2008/0102866 A1* | 5/2008 | Fiorillo | H04M 3/2281 455/466 |
| 2008/0205452 A1 | 8/2008 | Chou | |
| 2010/0015946 A1* | 1/2010 | Zhang | H04L 12/14 455/406 |
| 2010/0157794 A1 | 6/2010 | Nakash | |
| 2011/0069618 A1 | 3/2011 | Wong et al. | |
| 2013/0108032 A1* | 5/2013 | Shaw | H04W 4/16 379/88.14 |
| 2013/0121154 A1 | 5/2013 | Guay et al. | |
| 2013/0286936 A1 | 10/2013 | Sen et al. | |
| 2013/0315062 A1 | 11/2013 | Riedl et al. | |
| 2014/0155112 A1* | 6/2014 | Molnar | H04L 65/1016 455/466 |
| 2014/0258434 A1* | 9/2014 | Hong | H04W 4/70 709/206 |
| 2015/0098391 A1* | 4/2015 | Sridhar | H04W 36/0022 370/329 |
| 2015/0103739 A1* | 4/2015 | Ni | H04W 4/16 370/328 |
| 2017/0111828 A1* | 4/2017 | Tsai | H04W 36/0022 |

OTHER PUBLICATIONS

International Search Report for corresponding International Application No. PCT/EP2016/054457 dated Apr. 18, 2016; 7 pages.
Written Opinion of the International Searching Authority for corresponding International Application No. PCT/EP2016/054457 dated Apr. 18, 2016; 11 pages.
International Preliminary Report on Patentability for corresponding International Application No. PCT/EP2016/054457 dated Feb. 22, 2017; 11 pages.
Extended European Search Report for corresponding EP Application No. 15275086.5 dated Sep. 8, 2015; 11 pages.

* cited by examiner

MOBILE TELECOMMUNICATIONS ROUTING

CROSS-REFERENCE TO RELATED APPLICATIONS

The present application is a National Phase entry of PCT Application No. PCT/EP2016/054457, filed on 2 Mar. 2016, which claims priority to EP Patent Application No. 15275086.5, filed on 25 Mar. 2015, which are hereby fully incorporated herein by reference.

TECHNICAL FIELD

This disclosure relates to mobile telecommunications systems and in particular to selective routing of traffic according to type.

BACKGROUND

There are currently a number of mobile telecommunications technologies available to the general user, offering a variety of services, in particular voice and data services, using a mixture of circuit-switched and packet-switched protocols. In general the more established systems have a wider coverage than newer systems which are still being introduced. Typically the newer technology is initially installed in a limited range of small cells where there is a particular need for coverage, with a partner macrocell network providing circuit-switched Fall Back (CSFB) services. In such an arrangement, in locations where both systems are available, network services, such as voice, are routed over a circuit switched network and data over a packet-switched network.

An added complication is that not all mobile user terminals are fully compatible with all mobile technologies. A particular measure which is used in the Long Term Evolution (LTE) standard is known as "Circuit Switched Fall Back", which is a mechanism that allows user terminals that do not have a capability to operate Voice-over-LTE (VoLTE) technology, and therefore cannot place voice calls over the packet-switched LTE (or "4G") system, to "fall-back" to the older circuit-switched 2G or 3G (or "UMTS") systems to make or receive voice calls whilst remaining attached to a 4G/LTE packet-switched radio access network (radio access network) for data services.

SMS text messages can be delivered over the LTE radio access network, if the SGs Interface defined in 3GPP TS 29.118 is supported, whereas non-VoLTE capable devices cannot receive voice calls over the LTE radio access network, which is why the Circuit Switched Fallback mechanism is required.

Traditionally, voice and text messages have followed the same route through the network since they had to be delivered over the same access network, using the same international mobile subscriber identity (IMSI) and mobile switching center server (MSCS), there being no alternative radio delivery mechanism for text messaging. However, the 4G system provides a way to deliver text messages in a different way to the delivery method for voice, and for which there is no need for the device to fall-back to the 2/3G network, and therefore there is no need to route the SMS via the Circuit Switched core if it is being delivered via the 4G RAN.

Current Circuit Switch Fall Back procedures in 3GPP require a dual attachment when users attach to a 4G network, one attachment against the 4G Evolved Packet Core (EPC), and a separate IMSI attachment to a MSC/VLR allocated in the Circuit Switched (circuit-switched) voice core for the purpose of routing voice calls and text messages to the device. When the 2/3G radio access network (and associated circuit-switched core) and the 4G radio access network (and associated EPC core) belong to different operators, the allocation of an MSC server in the 2/3G partner operator's voice core network also implies that SMS terminating messages may have to be routed via the partner's circuit-switched core network, even when the subscriber is attached to its home operator's 4G radio access network. This is suboptimal since SMS messages would be routed via the 2/3G voice core before final delivery to the UE via the 4G access, resulting in an unnecessary dependency on the 2/3G voice core. There may also be commercial implications when the 4G and 2/3G operators are not the same.

SUMMARY

The present disclosure accordingly provides a communications routing management entity for a communications network arranged to respond to a routing request relating to a user identity by retrieving a routing instruction from a database of routing instructions, wherein the communications routing management entity is arranged to distinguish between a first type of requested communications connection and a second type of requested communications connection, and retrieving a first routing instruction associated with the first type of requested communications connection and retrieving a second routing instruction associated with the second type of requested communications connection.

In some embodiments, in response to a routing request relating to the user identity, a routing instruction is retrieved from a database of routing instructions, in which a first routing instruction is retrieved in response to a first type of requested communications connection and a second routing instruction is retrieved in response to a second type of requested communications connection. In one embodiment the first type of communications connection is carried by a circuit-switching protocol and the second type of communications connection is carried by a packet-switching protocol, and voice calls are directed to the first communications connection and text messages are directed to the second communications connection.

Embodiments of the disclosure therefore propose an intelligent "service-aware routing" function to route incoming requests to different MSCs depending on whether a routing request is made for a service that requires a circuit switched connection (such as voice calls) or for a service which can be handled by a packet switched connection (e.g. text messaging). Embodiments of the disclosure may be used in conjunction with a "service-aware attachment" function that splits an IMSI attachment into two separate "service-specific" attachments, for example one for circuit switching routing and one for packet switched routing, and described in our co-pending International Patent Publication No. WO 2016/150669, which claims priority from the same European application as the present application. These functions may be incorporated respectively in the mobile management entities and home subscriber servers of the conventional network, or may be arranged to operate as an intermediary between them.

In this way, embodiments of the disclosure can maintain two separate identities in the circuit switched domain in a standard circuit-switched fallback request. In a National roaming scenario, where different operators provide 2/3G and 4G respectively, the mechanism included in this disclosure allows for some types of traffic to be routed directly via the 4G network without any involvement from the circuit-switched voice core. This can represent a cost saving as well as a reduction in overall complexity and dependency on the 2/3G operator. One situation in which this facility may be used allows text messages to be redirected so that they can continue to be handled by the core data (4G) network packet switched data network, whilst voice traffic unsuitable for the 4G system is handled by the older 2G/3G system.

The service-aware attachment function may be deployed within a mobile management entity and the service-aware routing function may be deployed in a home server associated with the user. Alternatively, both functions may reside in a "Virtual Core" attachment management entity that sits in the interface between a mobile management entity and a mobile switching center, and between a gateway MSC (GMSC) and the Home Location register. Embodiments of both arrangements will be described.

The service-aware attachment function could also act as a "virtual" MSC to route SMS messages to subscribers currently attached to the 4G radio access network, avoiding the need for an extra MSC in the network dedicated to routing SMS messages.

BRIEF DESCRIPTION OF THE DRAWINGS

Embodiments of the present disclosure will now be described, by way of example only, with reference to the accompanying drawings, in which.

DETAILED DESCRIPTION

The embodiments to be described are intended to be compatible with the 3GPP standards, and in particular use outputs from, and provide inputs to, the TS 25.272 Section 5.2 Dual attachment circuit switched fallback process. This process will be summarized here, with reference to FIGS. 1 to 3, which show the interactions between a user equipment (UE) 1, a mobile management entity (MME) 3, a mobile switching center 4 and associated visitor location register (VLR) 40 and a home subscriber server (HSS) 5 during attachment (FIG. 1), and their co-operation with a gateway MSC 6 for handling incoming voice calls (FIG. 2) and text messages (FIG. 3). The HSS stores a concordance 80 between the MSISDN numbers (directory number) and the IMSI numbers (permanent number associated with the Subscriber identity module (SIM) installed in the handset) for which it is responsible, and routing information for those handsets.

Figure 1:
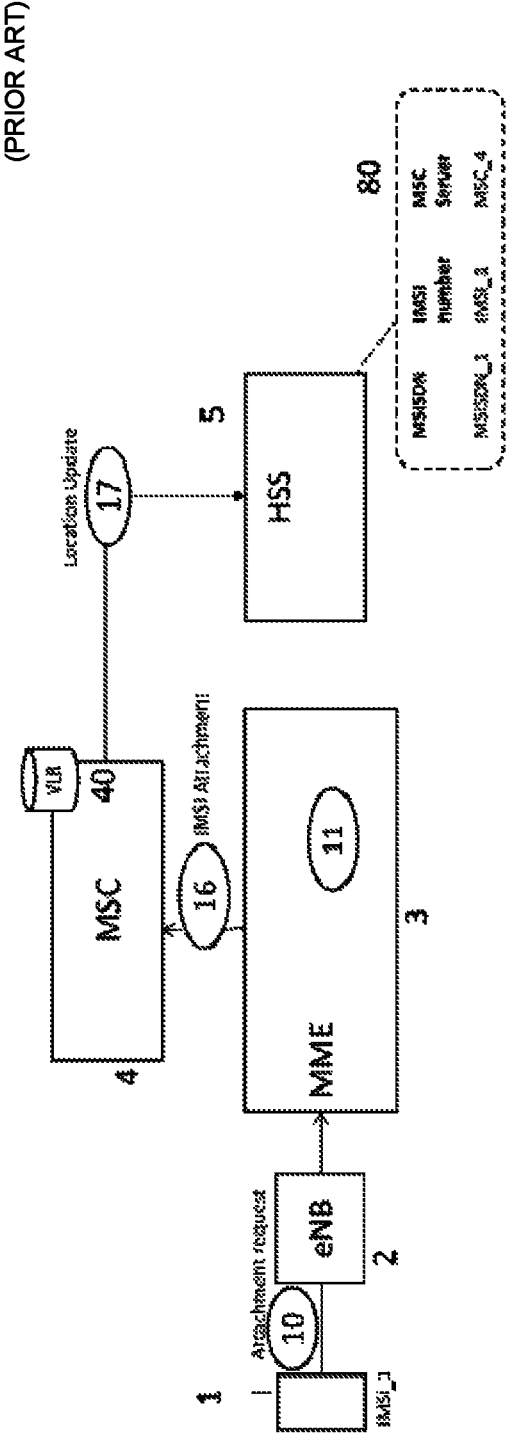
FIG. 1 is a diagram representing the prior art dual attachment circuit switched fallback process of the 3GPP TS25.272 standard with which this embodiment interacts.

Referring first to FIG. 1, when the user equipment (UE) 1 establishes a wireless connection through a base station 2 (also known as an evolved Node B or eNB) to the network infrastructure, it initiates the attach procedure by the transmission of an Attach Request message 10 to the MME 3. The request 10 includes an Attach Type field indicating that the UE requests a combined EPS/IMSI attach and informs the network that the UE 1 is capable and configured to use circuit-switched fallback and/or SMS over SGs.

An attach procedure 11 is then followed by the MME 3. If the Attach Request message includes an Attach Type indicating that the UE 1 requests a combined EPS/IMSI attach, the MME 3 allocates a new location area identity (LAI) for the UE. The MME 3 derives a VLR number based on the newly allocated LAI and other data provided by the UE 1.

The MME then initiates a location update procedure by transmitting a location update (at 16) towards the new MSC/VLR 4, 40 using subscriber data 80 maintained by the HSS 5. The VLR 40 creates an association with the MME 3 by storing the MME name. The VLR 40 then performs a Location Updating procedure in the circuit-switched domain (at 17), to inform a routing table 80 in the HSS 5 of the new location of the UE 1. The routing table 80 stores the network identities (IMSI and MSISDN) of the UE 1, and the identity of the currently serving MSC 4.

Figure 2:
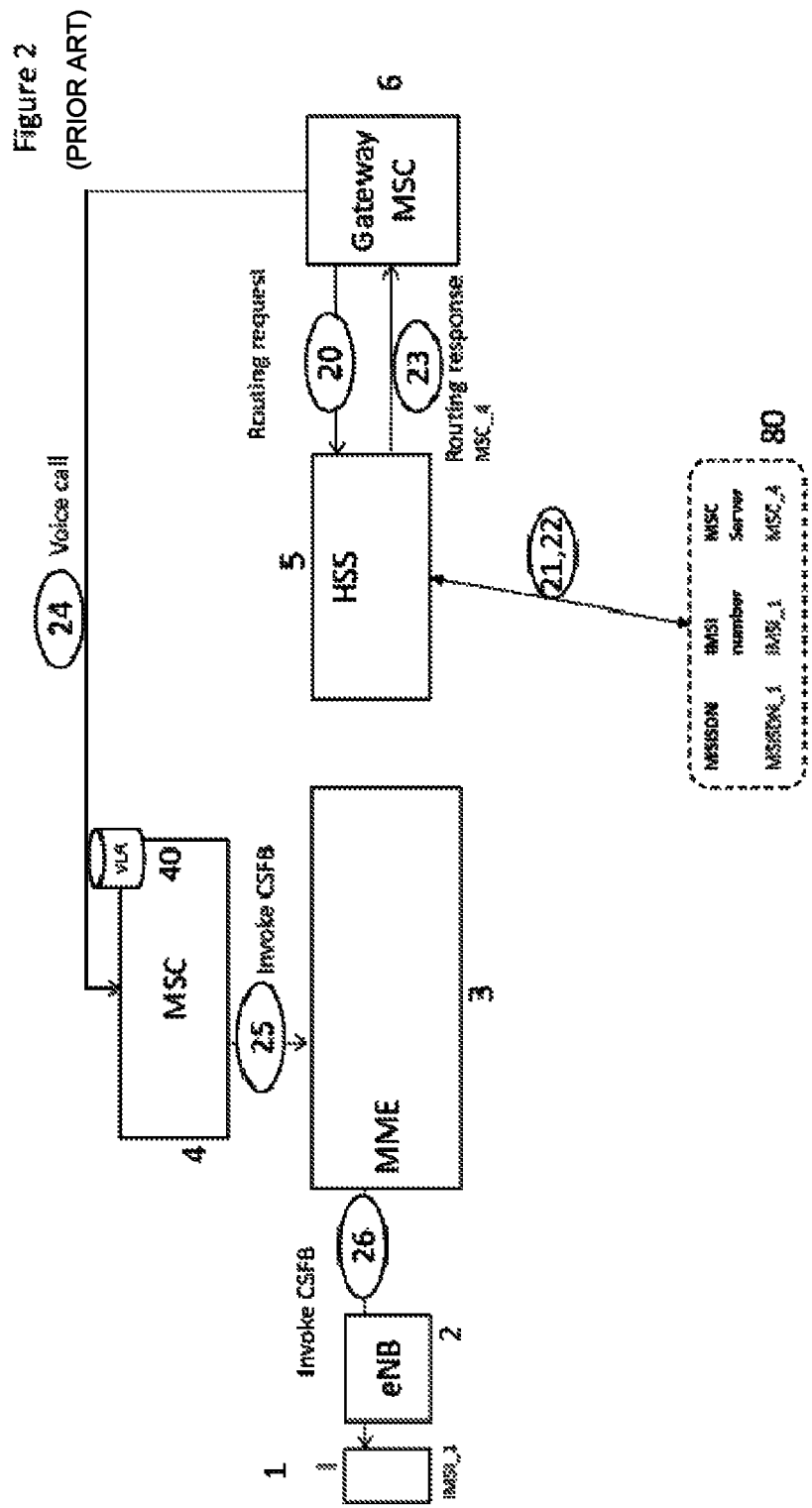
FIG. 2 is a diagram representing the prior art voice call connection process.
Figure 3:
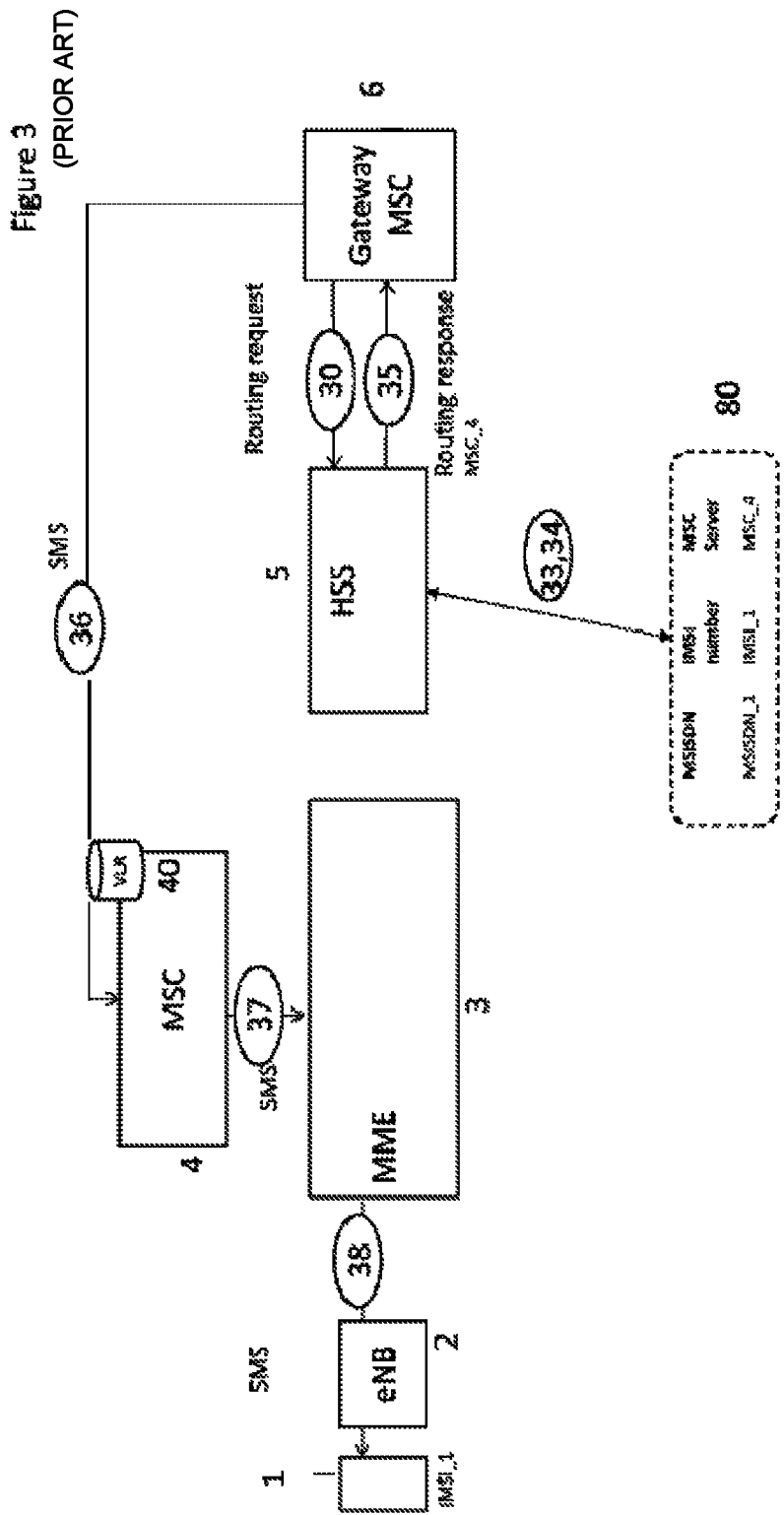
FIG. 3 is a diagram representing the prior art text message connection process.

In this prior art system, incoming voice calls are handled as shown in FIG. 2. An incoming call request is received by a gateway MSC 6 and a routing request is made to the destinations user's HSS 5 (at 20), which retrieves the information held in the routing table 80 (at 21, 22) to generate a routing response (at 23) identifying the currently-serving MSC 4. The call is then routed to that MSC 4 (at 24) which, on identifying that the call is a voice call, instructs the MME 3 to operate in circuit switched mode ("circuit switched fallback") (at 25) and connect the call to the base station 2 and ultimately to the user equipment 1 (at 26).

In this prior art system, incoming text messages are handled as shown in FIG. 3. An incoming text message is received by the gateway MSC 6 and a routing request is directed to the destinations user's HSS 5 (at 30), which retrieves the information held in the routing table 80 (at 33, 34) to generate a routing response (at 35) identifying the currently-serving MSC 4. The text message is then routed to that MSC 4 (at 36) which, on identifying that the call is a text message, instructs the MME 3 to operate in packet switched mode (at 37) and transmit the text message to the base station 2 and ultimately to the user equipment 1 (at 38).

A first embodiment will now be described with reference to FIGS. 4, 5, 6, 11 and 12. As will be seen by comparison with the previous three figures, the principal differences in the architecture are the presence of a second mobile switching center 7, and associated VLR 70, for managing text messages. In this embodiment the standard MSC 4 is only required to handle connections which require a circuit switched connection, in particular voice messages. In addition the mobile management entity 3 includes an additional service-aware attachment function 39, and the Home Subscriber server 5 includes an additional service-aware routing function 59.

In this embodiment, the signaling flow operates as follows, with reference to FIGS. 4, 5 and 6.

Figure 4:
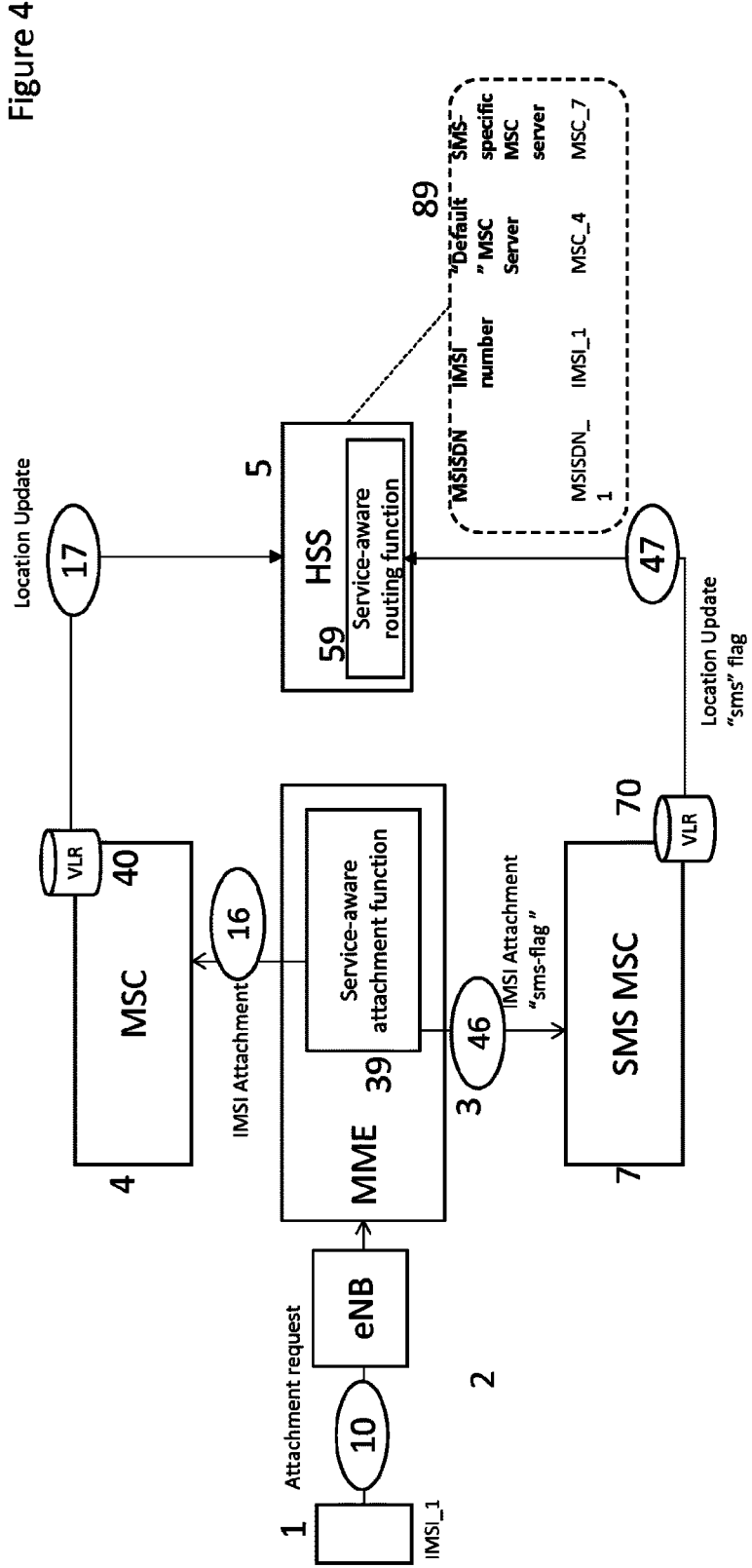
FIG. 4 is a diagram representing a dual attachment circuit switched fallback process according to a first embodiment.
Figure 11:
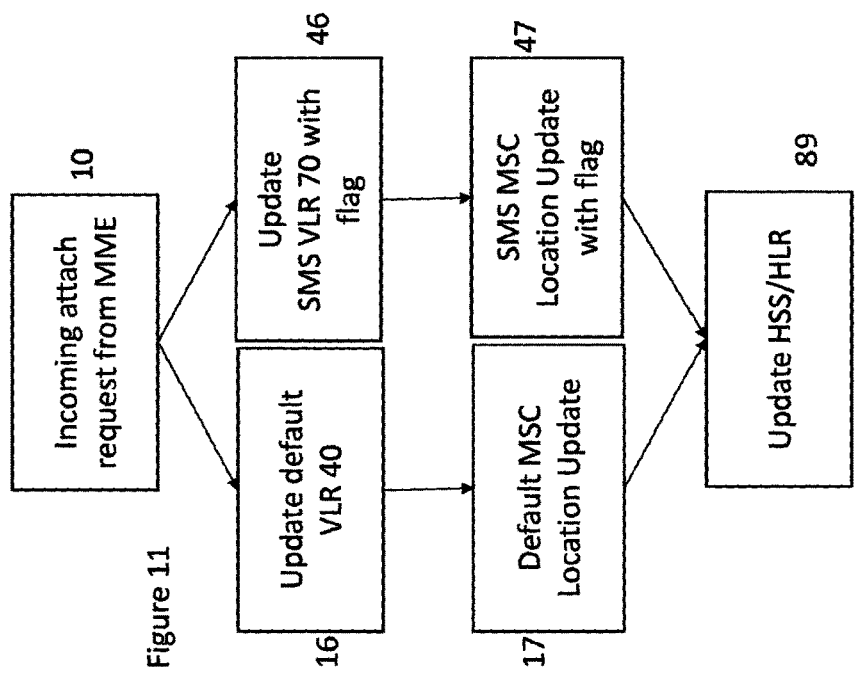
FIG. 11 is a flow diagram depicting an attachment operation of the first embodiment.

FIG. 4 depicts the information flows on attachment of a mobile terminal 1 to an eNB 2, and FIG. 11 depicts the operation of the Service Aware attachment function 39 in the MME 3 and the service-aware routing function 59 in the HSS 5. In response to the standard attachment request 10 sent from the UE 1, by way of the eNB 2 to the mobile management entity (MME) 3, the Service Aware attachment function 39 in the MME forwards the IMSI attach request to both the "default" MSC 4 (at 16) and the SMS MSC 7 (at 42). The second attachment request 46 includes a flag identifying it as for use with text messaging services.

Each MSC 4, 7 then transmits a respective location update 17, 47 to the HSS 5, the update 47 generated by the SMS MSC 7 again including a "flag" to indicate that this MSC is specific to text services. The service-aware routing function in the HSS 5 then updates its internal table 89 to map the IMSI number to the default MSC 4 and to the SMS-specific MSC server 7.

Figure 5:
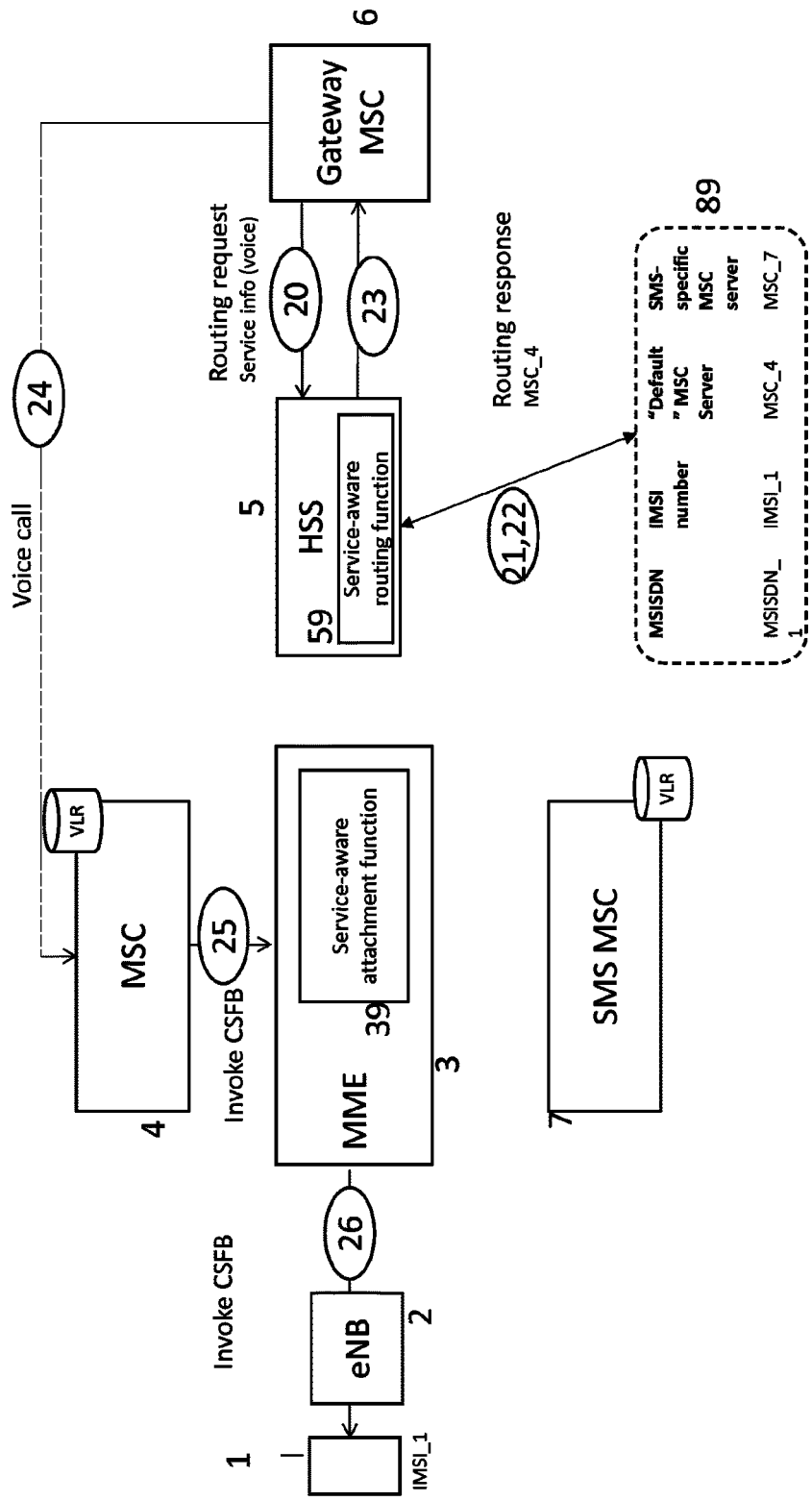
FIG. 5 is a diagram representing a voice call connection process according to this first embodiment.
Figure 12:
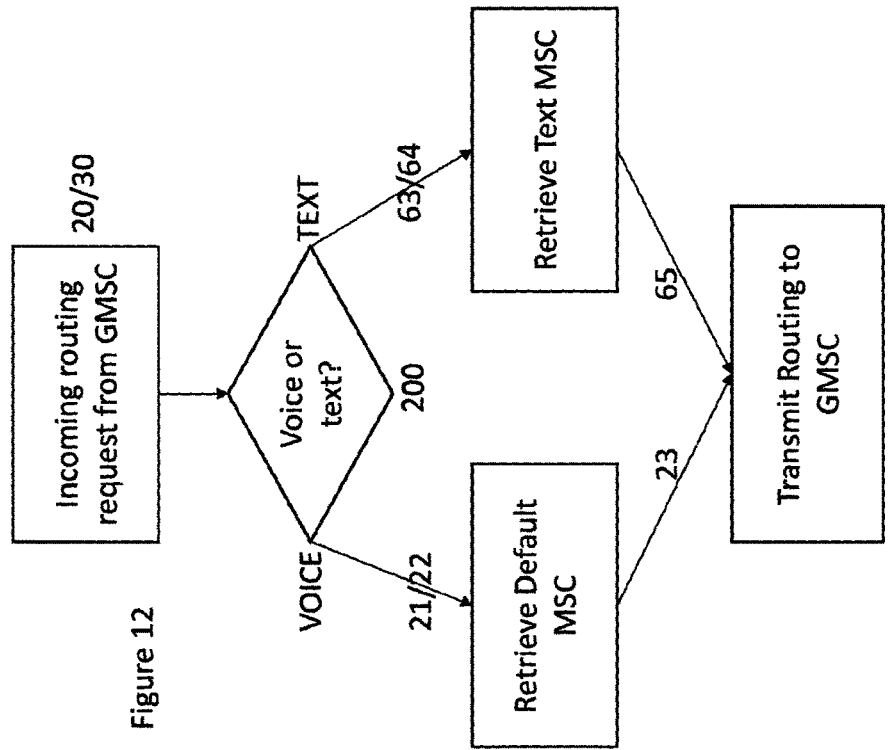
FIG. 12 is a flow diagram depicting a routing operation of the first embodiment.

FIG. 5 depicts the information flows in this embodiment when a request 20 for connection of a voice call is received at the gateway MSC 6, and the left hand side of FIG. 12 depicts the operation of the Service Aware routing function 59 of this embodiment. The process is similar to that of the standard procedure depicted in FIG. 2. The Service-aware routing function 59 is set to determine whether the incoming routing request is marked as a text message (at 200) and, recognizing the routing request 20 as not relating to a text message, selects the "default" MSC server 4 from the routing table 89 (at 21, 22), causing the call connection process 23, 24, 25, 26 to proceed as normal.

Figure 6:
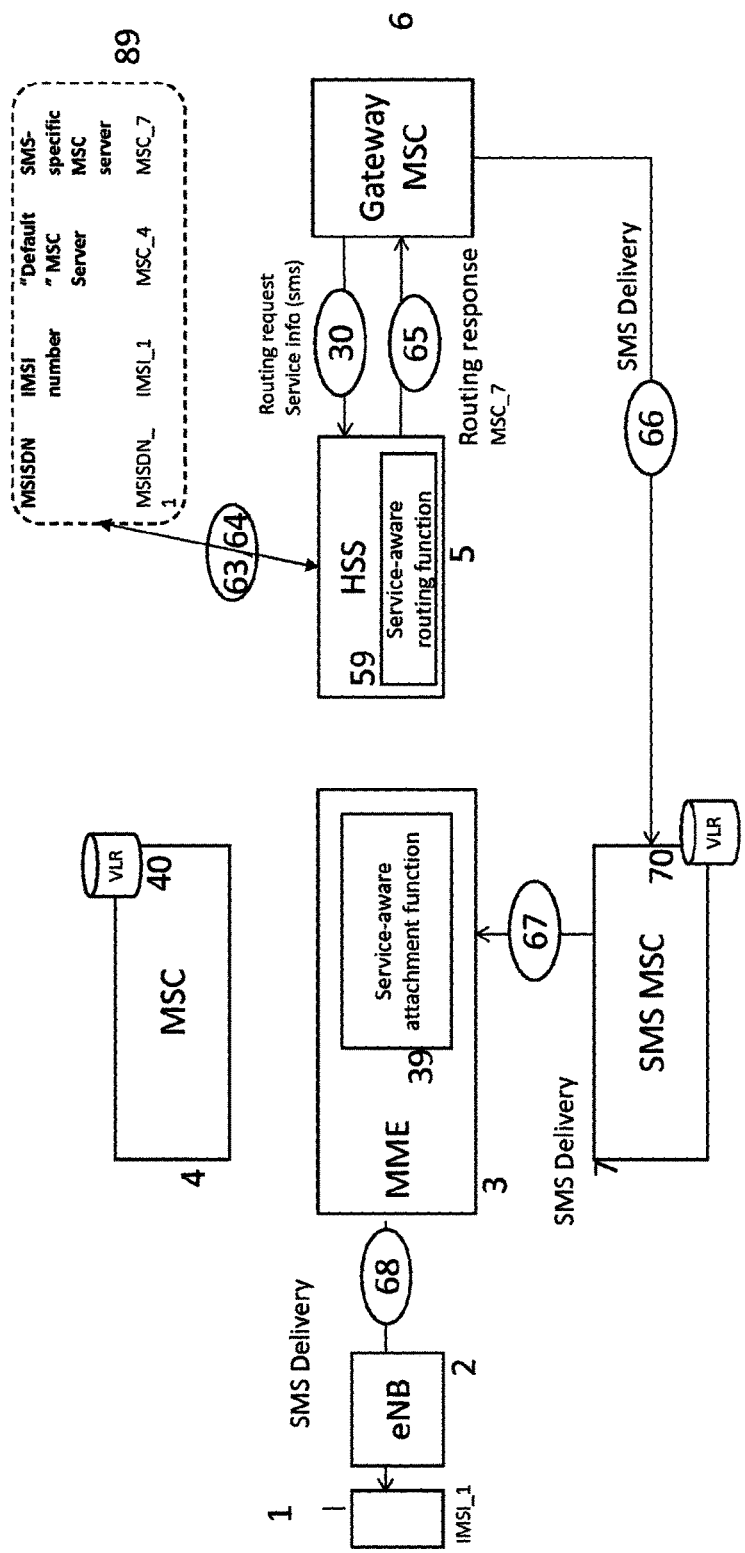
FIG. 6 is a diagram representing a text message connection process according to this first embodiment.

FIG. 6 and the right hand side of FIG. 12 depict the operation of this embodiment when an incoming text message is received at the gateway MSC 6. A conventional routing request 30 is directed to the destination user's HSS 5. However, unlike the prior art situation depicted in FIG. 3, the HSS has a Service-aware routing function 59 which recognizes the text message 30 as relating to a data service (at 200) and therefore retrieves the information relating to the SMS-specific server 7 from the routing table 89 (at 63, 64), and generates a routing response 65 to the gateway MSC, identifying the text server 7 instead of the default server 4. The text message is then routed to that MSC 7 (at 66) and the MME 3 (at 67) to forward the text message to the base station 2 and ultimately to the user equipment 1 (at 68). By routing the text message by a dedicated (4G) MSC the text message can be delivered without having to use the circuit-switched fallback capability inherent in the operation of the default MSC 4.

A second embodiment will now be described with reference to FIGS. 7, 8, 9 and 10, 13 and 14 using an evolved packet core (EPC) architecture. In this embodiment the conventional MME 3, MSC 4, and HSS 5 are present, but instead of having the respective service-aware attachment function 39 and the service-aware routing function 59 installed, they are now configured to interact through a dedicated server 9 which provides both the service-aware attachment function and the service-aware routing functions (hereinafter referred to as SAARF). It therefore replaces some of the functions of the MME 3 and HSS 5.

Figure 7:
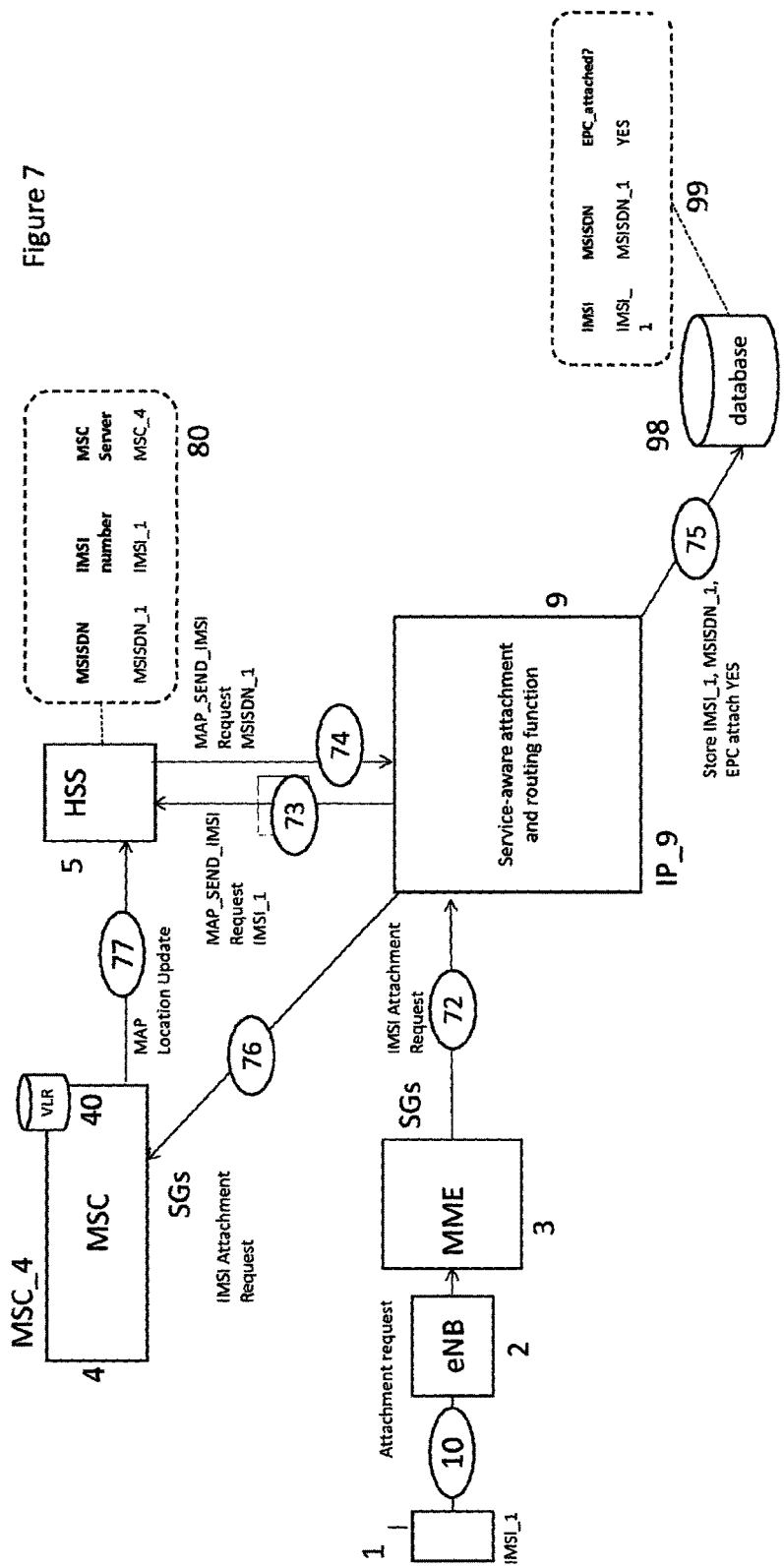
FIG. 7 is a diagram representing a dual attachment circuit switched fallback process according to a second embodiment
Figure 13:
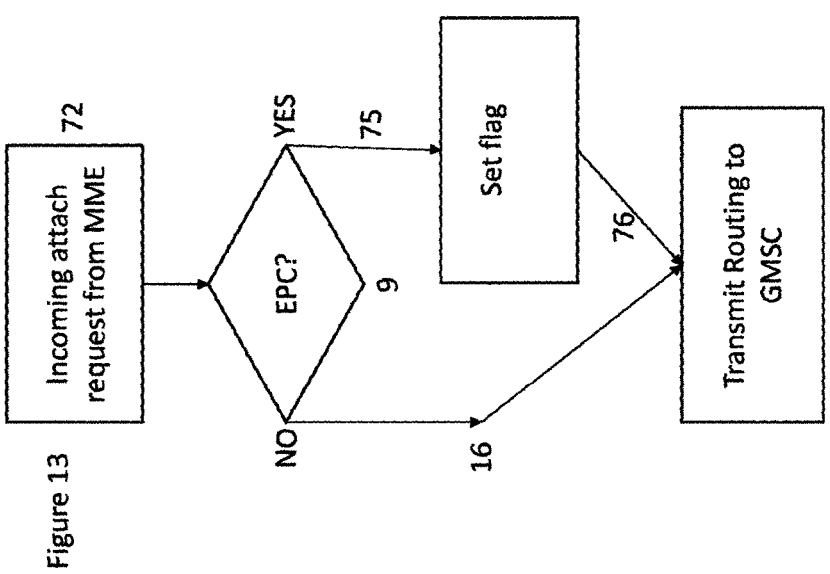
FIG. 13 is a flow diagram depicting an attachment operation of the second embodiment.

FIG. 7 and FIG. 13 depict the attachment process of this second embodiment when a user terminal 1 first attaches to a base station 2. The process begins with the user equipment 1 sending a standard attachment request 10 to the base station 2, which is forwarded to the mobile management entity 3. In this embodiment, the attach request is not forwarded directly to the Mobile Switching Center 4, but to the Service-aware attachment and routing function server 9 (at 72). The SAARF server 9 queries the HSS 5 (at 72) to identify the MSISDN number associated with the IMSI number in the attachment request, and the response from the HLR (73) contains the MSISDN number. (Note that in this embodiment the HSS 5 is only required to maintain this concordance: routing updates are carried out by the SAARF server 9, as will be described later).

The SAARF server 9 transmits a message 75 to an associated database 98 to indicate that the UE 1 identified by MSISDN _1 is attached to an evolved packet core (EPC) MME 3 and this information is stored in a routing table 99. If the IMSI attachment request comes from an MME 3 which is not EPC-compatible the service-aware attachment and routing function 9 does not set the EPC flag in the database 98.

The IMSI attach is then forwarded on to the MSC 4 (at 76) in a similar manner to the attach procedures 16, 46 described with reference to FIGS. 1 and 4, and the HSS 5 is similarly updated (at 77).

Figure 8:
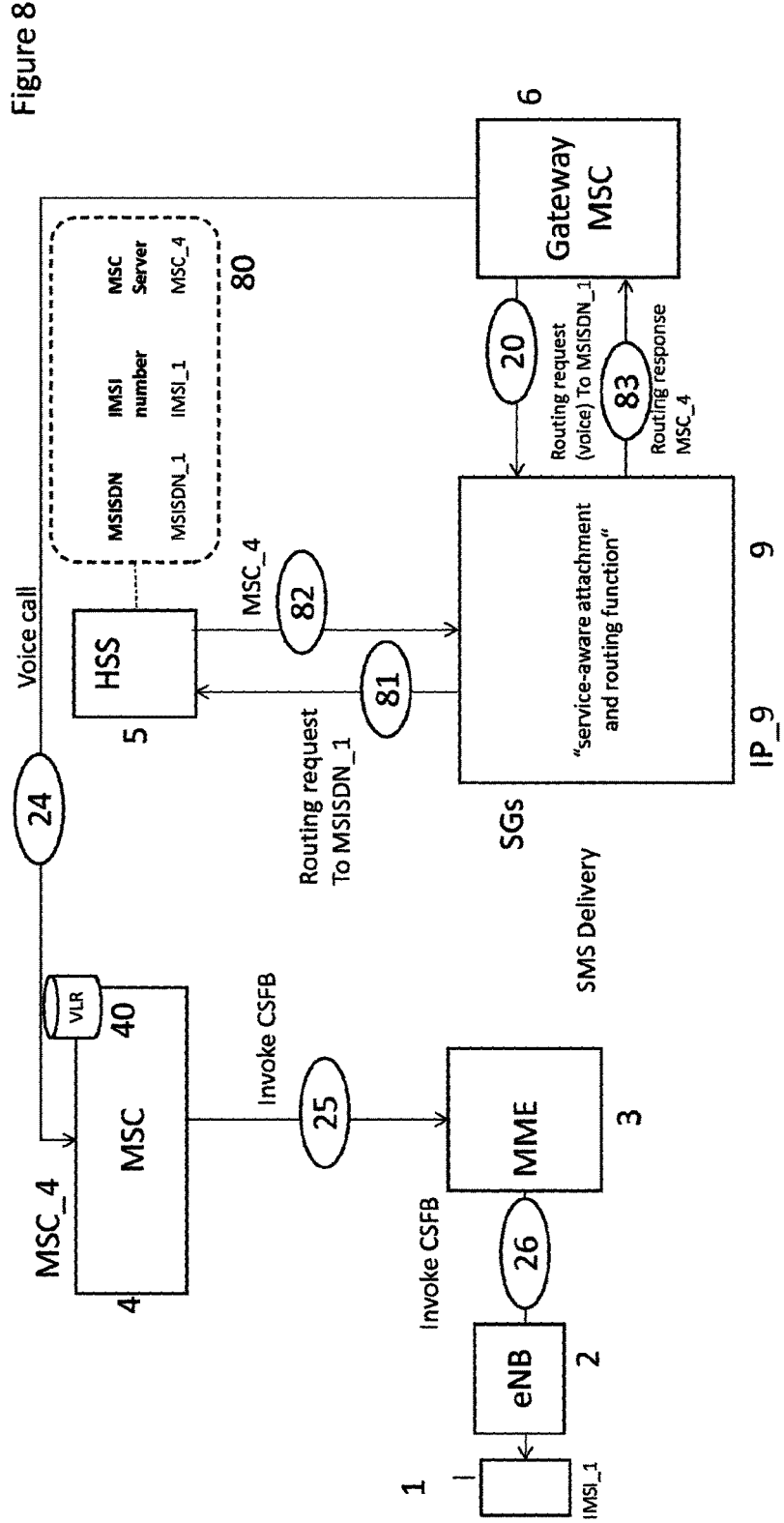
FIG. 8 is a diagram representing a voice call connection process according to this second embodiment.
Figure 14:
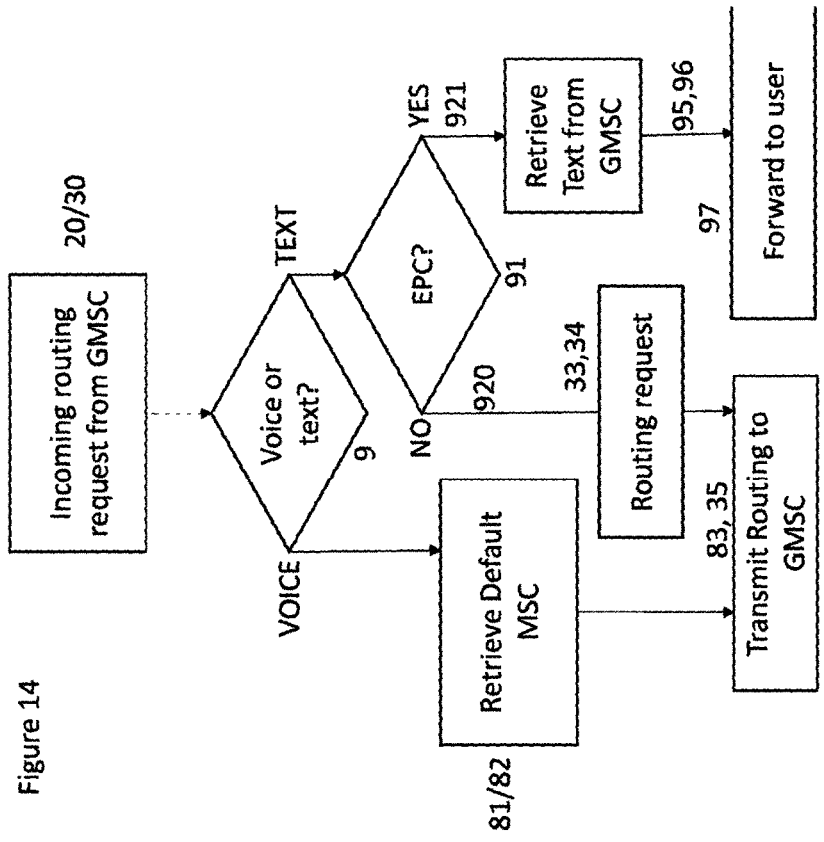
FIG. 14 is a flow diagram depicting a routing operation of the second embodiment.

In this embodiment, incoming voice calls are handled as depicted in FIG. 8 and the left hand side of FIG. 14. The gateway MSC 6 transmits a routing request 20 to the attachment and routing server 9. The server 9 identifies the call as a voice call, and which refers the routing request to the HLR (at 81) and receives a response indicating the appropriate MSC 4 (at 82), which is communicated to the gateway MSC 6 (at 83) which then connects the call as a standard circuit switched fallback connection (at 24, 25, 26).

Figure 9:
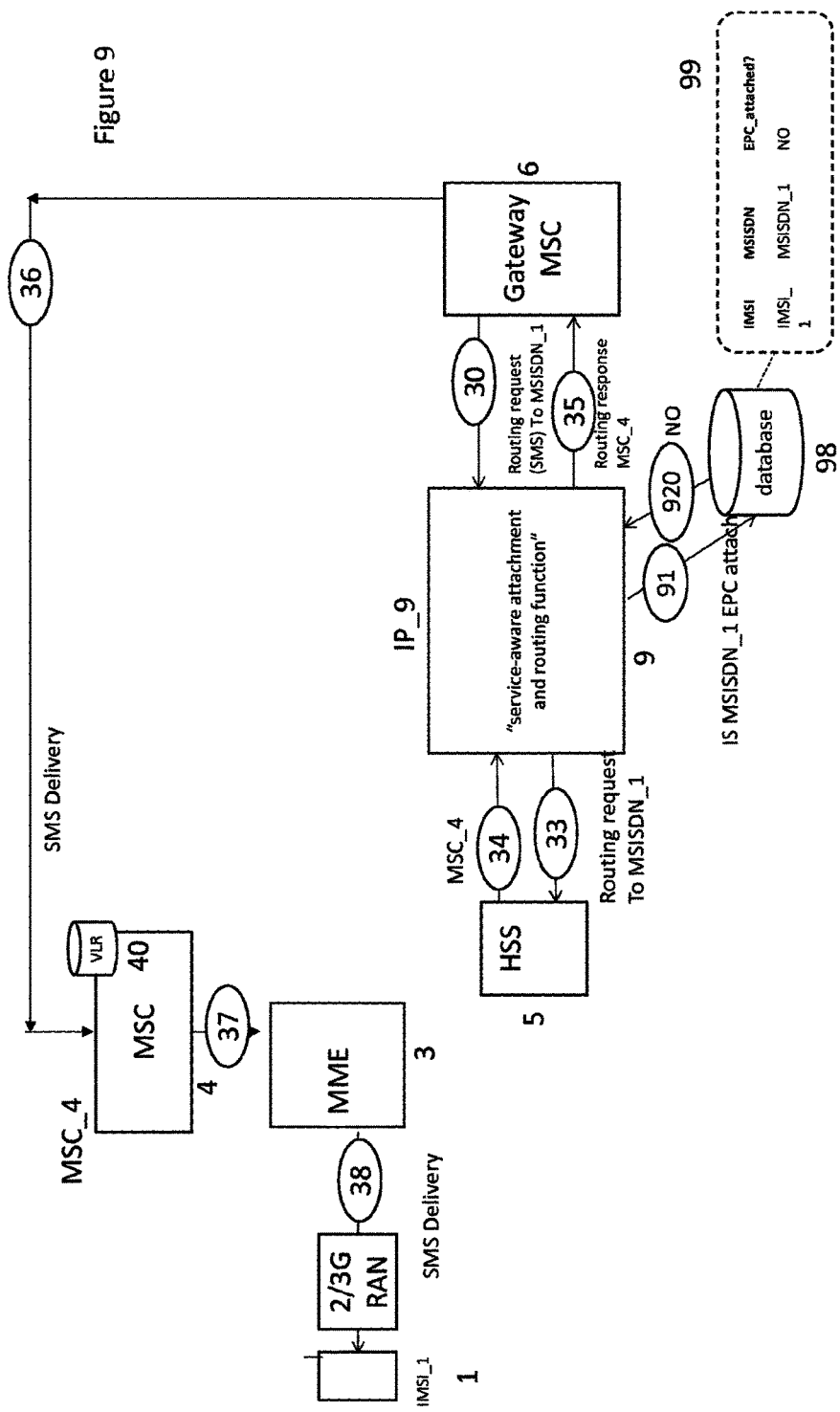
FIG. 9 is a diagram representing a text message connection process according to this second embodiment in a first condition.
Figure 10:
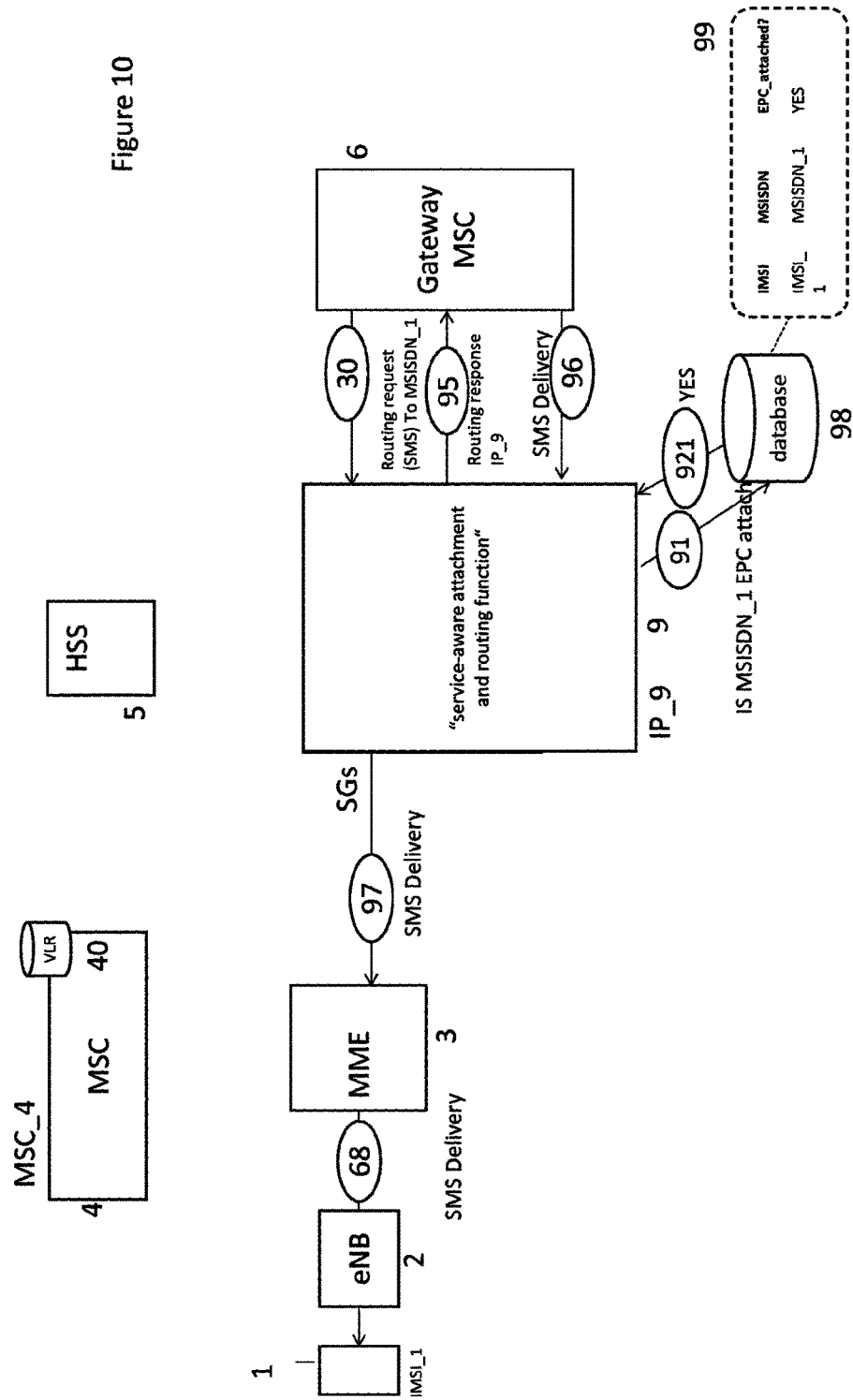
FIG. 10 is a diagram representing a text message connection process according to this second embodiment in a second condition.

Incoming SMS text messages are handled in two different ways, depending on whether an EPC attachment has been recorded in the database 98. These are depicted in FIGS. 9 and 10, and the right hand side of FIG. 14. As shown in both FIG. 9 and FIG. 10, an SMS routing request 30 is sent from the gateway MSC 6 to the SAARF server 9, which searches the record 99 of the user terminal 1 in the database 98 (at 91) to identify whether the EPC flag is set, and receives either a negative response (920, FIG. 9) or a positive response 921 (FIG. 10). If the response is negative (FIG. 9), the SAARF server continues with delivery of the text message following the standard procedure depicted in FIG. 3 (at 33-38), the SAARF server itself operating as a standard HSS 5. However, if the return 921 indicates that the EPC flag is set (at 921), the SAARF server 9 recognizes that the user terminal 1 has been attached using the process of FIG. 7 (see 72). It can therefore forward the incoming text message directly to the MME 3. It generates a routing response 95 to the gateway MSC 6 requesting the text message itself be routed to the SAARF server and, on receiving the message 96 it forwards it to the MME 3 (at 97) and thus to the user terminal (at 68).

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A system comprising:
a communications management server for a communications network arranged to respond to a routing request relating to a user identity by retrieving a routing instruction from a database of routing instructions, wherein the communications routing management server is arranged to distinguish between a first type of requested communications connection and a second type of requested communications connection, to retrieve a first routing instruction associated with the first type of requested communications connection and to retrieve a second routing instruction associated with the second type of requested communications connection; and
an attachment management server arranged to process an attachment request received from terminal equipment to cause a location update to be performed in a service register associated with the terminal equipment, and arranged to perform a service-aware attachment function to cause the service register to associate the user identity with two or more alternative routing managers, each appropriate for a respective type of incoming communication service types,
wherein the communications management server and the attachment management server are arranged to intercept attachment requests directed from a mobility management server to a home subscriber server, and to intercept routing requests directed from a gateway mobile switching center to the home subscriber server, in order to perform attachment and routing processes adapted to different types of requested service.

2. The system according to claim 1, wherein the communications management server is incorporated in the home subscriber server arranged for generation of routing instruction.

3. The system according to claim 1, wherein the first type of requested communications connection is carried by a circuit-switching protocol and the second type of requested communications connection is carried by a packet-switching protocol.

4. The system according to claim 1, configured to direct voice calls to the first type of communications connection and to direct text messages to the second type of communications connection.

5. A method for processing a routing request relating to a user identity, the method comprising:
by a communications routing management server:
distinguishing between a first type of requested communications connection and a second type of requested communications connection,
associating respective first and second routing instructions associated with the user identity with the first and second types of requested communications connections, and
in response to a routing request in respect of the user identity for one of the first or second types of communications connections, retrieving the routing instruction associated with the respective type of requested communications connection from a database of routing instructions; and by an attachment management server:
processing an attachment request received from terminal equipment to cause a location update to be performed in a service register associated with the terminal equipment, and
performing a service-aware attachment function to cause the service register to associate the user identity with two or more alternative routing managers, each appropriate for a respective type of incoming communication service types,
wherein the communications routing management server and the attachment management server are arranged to intercept attachment requests directed from a mobility management server to a home subscriber server, and to intercept routing requests directed from a gateway mobile switching center to the home subscriber server, in order to perform attachment and routing processes adapted to different types of requested service.

6. The method according to claim 5, wherein the user identity is associated with a first default mobile switching center to which circuit switched traffic is routed and a second mobile switching center to which packet switched traffic is routed.

7. The method according to claim 5 wherein, in response to a routing request relating to the user identity, a routing instruction is retrieved from a database of routing instructions, in which a first routing instruction is retrieved in response to a first type of requested communications connection and a second routing instruction is retrieved in response to a second type of requested communications connection.

8. The method according to claim 5, wherein the first type of communications connection is carried by a circuit-switching protocol and the second type of communications connection is carried by a packet-switching protocol.

9. The method according to claim 8, wherein voice calls are directed to the first communications connection and text messages are directed to the second communications connection.

* * * * *